US 8,176,501 B2

(12) United States Patent
Prakash et al.

(10) Patent No.: US 8,176,501 B2
(45) Date of Patent: May 8, 2012

(54) ENABLING EFFICIENT INPUT/OUTPUT (I/O) VIRTUALIZATION

(75) Inventors: Ramkrishna V. Prakash, Austin, TX (US); Surender V. Brahmaroutu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1163 days.

(21) Appl. No.: 11/474,173

(22) Filed: Jun. 23, 2006

(65) Prior Publication Data
US 2007/0300241 A1    Dec. 27, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................................ 719/317
(58) Field of Classification Search .................... 719/317
See application file for complete search history.

(56) References Cited

U.S. PATENT DOCUMENTS

| | | | |
|---|---|---|---|
| 6,757,778 B1* | 6/2004 | van Rietschote | 711/6 |
| 7,278,030 B1 | 10/2007 | Chen et al. | |
| 2003/0084209 A1* | 5/2003 | Chadalapaka | 710/5 |
| 2004/0167996 A1 | 8/2004 | Takamura et al. | |
| 2005/0132365 A1* | 6/2005 | Madukkarumukumana et al. | 718/1 |
| 2005/0289540 A1* | 12/2005 | Nguyen et al. | 718/1 |
| 2006/0200820 A1 | 9/2006 | Cherkasova et al. | |
| 2006/0200821 A1 | 9/2006 | Cherkasova et al. | |

OTHER PUBLICATIONS

Menon, Aravind et al, "Optimizing Network Virtualization in Xen", Apr. 17, 2006, pp. 1-23.*
Weber et al., File Systems for the Scalable Enterprise, Dell Power Solutions, Feb. 2005, pp. 82-85, available at http://www.dell.com/downloads/global/power/ps1q05-20040172-Goff.pdf.

* cited by examiner

*Primary Examiner* — Andy Ho
*Assistant Examiner* — Timothy A Mudrick
(74) *Attorney, Agent, or Firm* — Baker Botts L.L.P.

(57) ABSTRACT

A method for virtualizing input/output whereby a back-end driver component running back-end in a privileged operating system address space configures an input/output adapter through a setup/control path is disclosed. The back-end driver component is used to register with the input/output adapter to allow for the receipt of information concerning a catastrophic event. Catastrophic event data is transmitted to an active front-end driver component running in a guest operating system address space, where a communication path was established between the active front-end driver component and the back-end driver component. The back-end driver component listens for requests from the active front-end driver component. Upon receipt, an input/output context association is established between an input/output context in the input/output adapter and the active front-end driver component. The association enables the guest operating system to perform an isolated input/output operation directly with the input/output adapter through a respective data input/output path.

20 Claims, 7 Drawing Sheets

ENABLING EFFICIENT INPUT/OUTPUT (I/O) VIRTUALIZATION

TECHNICAL FIELD

This invention relates generally to information handling systems and, more particularly, to a method a system to virtualize input/output among multiple guest operating systems.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include computer systems, data storage systems, and networking systems.

Examples of information handling systems, such as computers, including servers and workstations, are often grouped in clusters to perform specific tasks. A server cluster is a group of independent servers that is managed as a single system and is characterized by higher availability, manageability, and scalability, as compared with groupings of unmanaged servers. A server cluster typically involves the configuration of a group of independent servers such that the servers appear in the network as a single machine or unit. Server clusters are often managed as a single system, share a common namespace on the network, and are designed specifically to tolerate component failures and to support the addition or subtraction of components in the cluster in a transparent manner. At a minimum, a server cluster includes two or more servers that are connected to one another by a network. The server cluster may include software driven methods by which each client of the server cluster may access the data stored in or controlled by a server of the server cluster. One software application that is used to manage the operation of a server cluster is Microsoft Cluster Service (MSCS), which is produced by the Microsoft Corporation of Redmond, Wash.

Examples of information handling typically performed by information handling systems may include input/output virtualization, for example. Conventional approaches to deal with input/output virtualization require that a privileged operating system own an input/output resource, such as an input/output adapter, and fully virtualize the input/output resource to all the guest operating systems.

SUMMARY

In accordance with the present disclosure, a system and method to virtualize input/output in an information handling system are disclosed. In one aspect, the method comprises configuring an input/output adapter using a back-end driver component running back-end in a privileged operating system address space through a setup/control path. The method also comprises registering with the input/output adapter using the back-end driver component to receive information concerning a catastrophic event. The method also comprises transmitting the information concerning the catastrophic event to an active front-end driver component running in the front-end in a guest operating system address space, a communication path having been established between the active front-end driver component and the back-end driver component. The method also comprises listening with the back-end driver component to a request from the active front-end driver component. The method also comprises establishing an input/output context association between an input/output context in the input/output adapter and the active front-end driver component, upon receiving the request from the active front-end driver component, the input/output context association enabling the guest operating system to perform an isolated input/output operation directly with the input/output adapter through a respective data input/output path.

In another aspect, the method comprises configuring an input/output adapter using a back-end setup/control driver component running back-end in a privileged operating system address space through a setup/control path, the back-end setup/control driver component communicating with an input/output virtualization driver. The method also comprises registering with the input/output adapter using the back-end setup/control driver component to receive information concerning a catastrophic event. The method also comprises transmitting the information concerning the catastrophic event to a plurality of active front-end driver components running in the front-end in a plurality of guest operating system address spaces, a communication path having been established between each of the plurality of active front-end driver components and the back-end setup/control driver component. The method also comprises receiving with the back-end setup/control driver component a request from the plurality of active front-end driver components.

The method and system disclosed herein may be advantageous in providing the following: (1) elimination of a single point of failure for input/output functions and establishment of new input/output connections, since not all communications, including not all control and data path communications, between applications running in the guest operating systems and the input/output adapter, traverse the back-end driver component, (2) a non-degraded input/output performance by decreasing any buffer remap and/or any buffer copy, (3) elimination of input/output bottlenecks may result due to elimination of a single scheduler for input/output, (4) decreased requirement for specialized drivers for the guest operating systems as well as the "Domain 0" privileged operating system environments, and/or (5) a decreased latency caused in registering an input/output event. Other technical advantages will be apparent to those of ordinary skill in the art having the benefit of the present disclosure and in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), processing resources such as a central processing unit (CPU) or hardware or software control logic, ROM, and/or other types of nonvolatile memory. Additional components of the information handling system may include disk drives, network ports for communication with external devices as well as various input and output devices, such as a keyboard, a mouse, and a video display. The information handling system may also include buses operable to transmit communications between the various hardware components.

Figure 1:
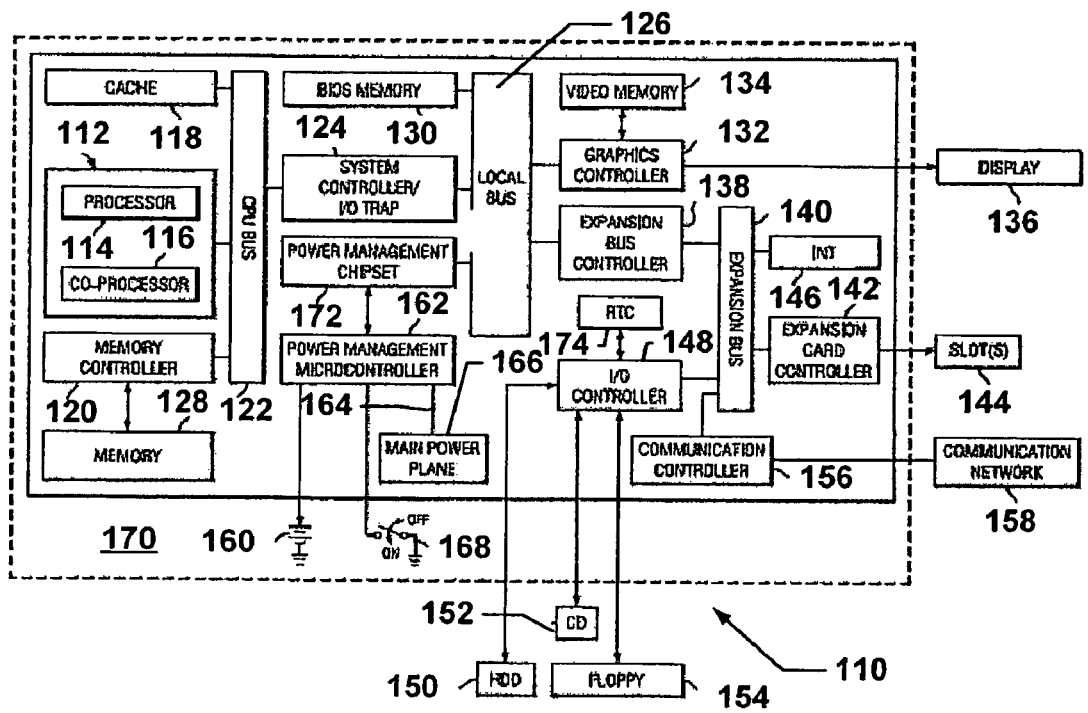
FIG. 1 is a block diagram showing an information handling system, according to teachings of the present disclosure.

Referring first to FIG. 1, a block diagram of an information handling system 110 is shown, according to teachings of the present disclosure. The information handling system 110 or the computer system 110 may include a microprocessor or CPU 112. The CPU 112 may include a processor 114 for handling integer operations and a co-processor 116 for handling floating point operations. The CPU 112 may be coupled to a cache 118 and a memory controller 120 via a CPU bus 122. A system controller input/output trap 124 may couple the CPU bus 122 to a local bus 126 and may be generally characterized as part of a system controller.

A main memory 128 of dynamic random access memory (DRAM) modules may be coupled to the CPU bus 122 by the memory controller 120. The main memory 128 may be divided into areas such as a system management mode memory area (not expressly shown). A basic input/output system (BIOS) memory 130 may also be coupled to the local bus 126. A FLASH memory or other nonvolatile memory may be used as the BIOS memory 130. A BIOS program (not expressly shown) may typically be stored in the BIOS memory 130. The BIOS program may include software that facilitates interaction with and between the information handling system 110 devices such as a keyboard (not expressly shown), a mouse (not expressly shown), and/or I/O devices. The BIOS memory 130 may also store system code (not expressly shown) operable to control a plurality of basic information handling system 110 operations.

A graphics controller 132 may be coupled to the local bus 126 and to a video memory 134. The video memory 134 may be operable to store information to be displayed on display panels 136. The display panel 136 may be an active matrix or passive matrix liquid crystal display, a cathode ray tube display, and/or another display technology. In selected applications, uses and/or instances, the graphics controller 132 may also be coupled to an integrated display, such as in a portable information handling system implementation.

A bus interface controller or expansion bus controller 138 may couple the local bus 126 to an expansion bus 140. The expansion bus 140 may be configured as an industry standard architecture (ISA) bus. Other buses, for example, a peripheral component interconnect bus, may also be used.

In certain information handling system 110 embodiments, an expansion card controller 142 may also be included and may be coupled to the expansion bus 140 as shown in FIG. 1. The expansion card controller 142 may be coupled to a plurality of information handling system 110 expansion slots 144. The expansion slots 144 may be configured to receive computer components (not expressly shown) such as an expansion card (e.g., modems, fax cards, communications cards, and/or other I/O devices).

An interrupt request generator 146 may also be coupled to the expansion bus 140. The interrupt request generator 146 may be operable to issue an interrupt service request over a predetermined interrupt request line in response to receipt of a request to issue an interrupt instruction from the CPU 112. An I/O controller 148, often referred to as a super I/O controller 148, may also be coupled to the expansion bus 140. The I/O controller 148 may interface to an integrated drive electronics HDD 150, a compact disk-read only memory drive 152, and/or a floppy disk drive (FDD) 154. Other disk drive devices (not expressly shown) that may be interfaced to the I/O controller 148 include a removable hard drive, a zip drive, a CD-RW drive, and a CD-DVD drive.

A communication controller 156 may be provided and may enable the information handling system 110 to communicate with a communication network 158, for example, an Ethernet network. The communication network 158 may include a local area network, a wide area network, the Internet, an Intranet, wireless broadband, and the like. The communication controller 156 may be employed to form a network interface for communicating with other information handling systems (not expressly shown) coupled to the communication network 158.

As shown in FIG. 1, the information handling system 110 may include a power supply 160, which may provide power to the many components and/or devices that form the information handling system 110. The power supply 160 may be a rechargeable battery, such as a nickel metal hydride or a lithium ion battery, when the information handling system 110 is embodied as a portable or notebook computer, an A/C power source, an uninterruptible power supply or other power source.

The power supply 160 may be coupled to a power management microcontroller 162. The power management microcontroller 162 may control the distribution of power from the power supply 160. More specifically, the power management microcontroller 162 may include a power output 164 coupled to a main power plane 166 that may supply power to the CPU 112 as well as to other information handling system 110 components. The power management microcontroller 162 may also be coupled to a power plane (not expressly shown) operable to supply power to an integrated panel display (not expressly shown), as well as to additional power delivery planes that may be included in the information handling system 110.

The power management microcontroller 162 may monitor a charge level of an attached battery and/or a UPS to determine when and when not to charge the battery or the UPS. The power management microcontroller 162 may also be coupled to a main power switch 168, which the user may actuate to turn the information handling system 110 on and off. While the power management microcontroller 162 may power down portions or components of the information handling system 110, for example, the CPU 112, the display 136, and/or the HDD 150, and the like, when not in use to conserve power, the power management microcontroller 162 itself may be substantially always coupled to a source of power, the power supply 160.

A computer system, a type of information handling system 110, may also include a power management chip set 172. The power management chip set 172 may be coupled to the CPU 112 via the local bus 126 so that the power management chip set 172 may receive power management and control commands from the CPU 112. The power management chip set 172 may be connected to a plurality of individual power planes operable to supply power to respective components of the information handling system 110, for example, the HDD 150, the FDD 154, and the like. In this manner, the power management chip set 172 may act under the direction of the CPU 112 to control the power supplied to the various power planes and components of a system.

A real-time clock 174 may also be coupled to the I/O controller 148 and the power management chip set 172. Inclusion of the real-time clock 174 may permit timed events and/or alarms to be transmitted to the power management chip set 172. The real-time clock 174 may be programmed to generate an alarm signal at a predetermined time as well as to perform other operations.

The information handling system 110 may be associated with a chassis 170. Generally, the chassis 170 may be referred to as the computer case and/or case that encloses some of the components within the information handling system 110. However, other components such as the CD drive 152; the floppy drive 154 and/or the HDD 150 may be placed internal to the chassis 170 and/or separately from the chassis 170 in a stand-alone enclosure (described below in more detail) and/or connected in series.

Figure 2:
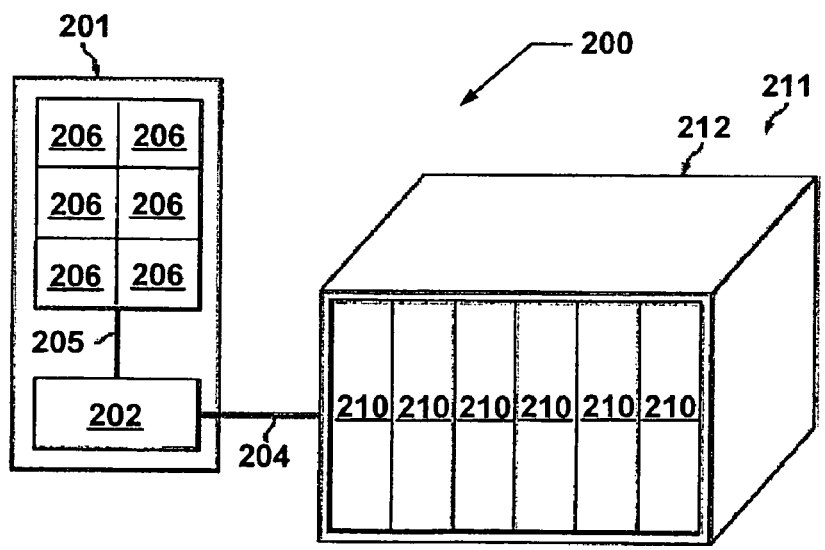
FIG. 2 is a block diagram showing an exemplary embodiment of a storage system including a controller mounted on an internal backplane having hard disk drives (HDD) and a stand-alone enclosure coupled to the controller having additional HDD connected via a SCSI bus, according to teachings of the present disclosure.
Figure 3:
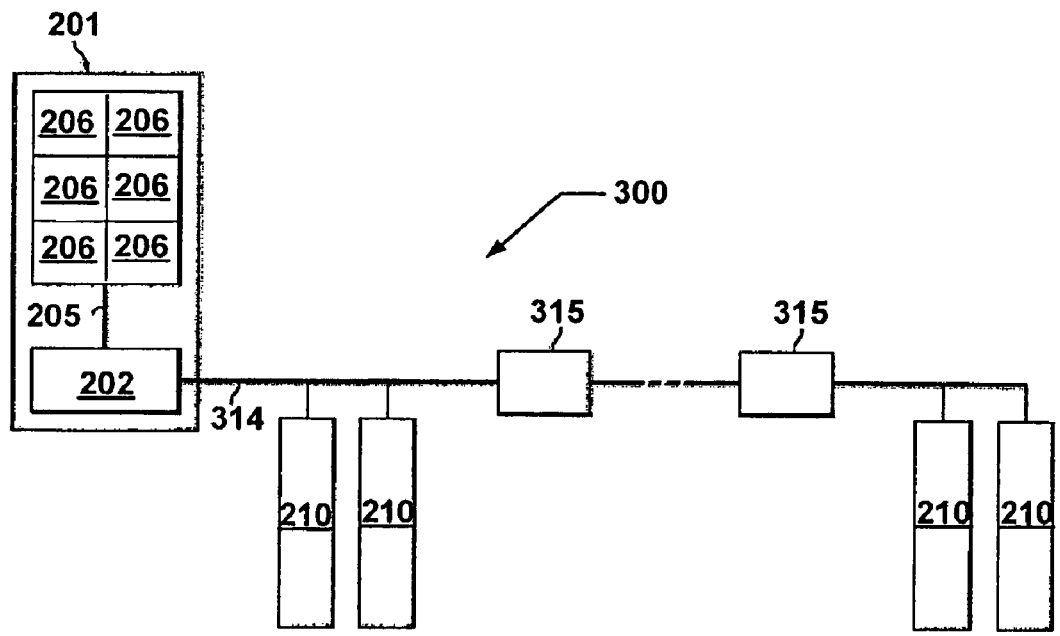
FIG. 3 is a block diagram showing an exemplary embodiment of a storage system including a controller mounted on an internal backplane having hardware devices such as HDD connected via a point-to-point link, according to teachings of the present disclosure.

As shown in FIGS. 2 and 3, for example, computer components may be communicatively connected to the information handling system 110 via a bus 204, as described below in more detail, or through a point-to-point link 314. In some embodiments, the information handling system 110 may include a storage system 200 (described below in more detail) that uses a small computer system interface (SCSI), Fibre Channel, serial attached SCSI (SAS), and/or other standard for communications between components and/or devices and the system. One example of a point-to-point link in an SAS storage subsystem may include a group of links also known as a "fabric" that uses a Fibre Channel standard for interfacing between controllers and drives.

FIGS. 2 and 3 are block diagrams showing various exemplary embodiments of the storage system 200, including a SCSI storage subsystem 211 and a SAS storage subsystem 300, respectively. Each storage subsystem 200 may include a controller 202 mounted on an internal backplane 201 having hard disk drives 206. The SCSI storage subsystem 211 may further include a stand-alone enclosure 212 that may include input/output expanders coupled to a controller 202 having additional SCSI devices such as the HDDs 210 connected via a SCSI bus 204. The SAS storage subsystem 300 may further include additional SCSI devices such as the HDDs 210 interconnected via the point-to-point link 314. The SAS storage subsystem 300 may further include expanders 315 that may be operable to regenerate, reshape, and/or retransmit a SCSI signal to additional SCSI devices such as the HDDs 210 interconnected via the point-to-point link 314.

A SCSI/SAS storage system such as storage system 200 may include a plurality of hardware and/or SCSI devices such as the internal HDDs 206 and the external HDDs 210 that are connected via I/O expanders. Other examples of SCSI devices may include tape drives (not expressly shown) and/or compact disk drives (not expressly shown).

The I/O expanders may allow the SCSI devices to connect to the storage system 200. The I/O expanders may include the SCSI expanders 315 that may include expander chips (not expressly shown), the internal backplane 201 and/or the enclosure 212 that may have connections for the SCSI devices to communicate with the storage system 200 via a SCSI bus such as the internal bus 205 and the external bus 204. Enclosures 212 may include a PowerVault 220 system and/or a PowerVault 210 system manufactured by Dell, Inc. Because the SCSI devices may reside at different locations and/or configurations within the storage system 200, the controller 202 may be used to direct communications to the address associated with each SCSI device.

The SAS storage subsystem 300 may further include SCSI expanders 315 that may be used to link and/or interconnect with hardware devices such as the HDD 210. However, there may not necessarily be one SCSI expander for each hardware device such as the HDD 210.

Each hardware and/or SCSI device within the storage system 200 may be represented as a SCSI target. Each SCSI device may include an address for communications between a processor and memory (not expressly shown) in the storage system 200 via an I/O controller such as the controller 202 shown on the internal backplane 201. The controller 202 may direct information between the SCSI devices via the internal bus 205 and/or the external bus 204.

The connections on SCSI devices may be interchangeable such that an internal SCSI device such as the internal HDD 206 may be placed in the enclosure 212, having an I/O expander. Similarly, the external HDD 210 may connect to the internal backplane 201 in lieu of the internal HDD 206.

Even though the SCSI devices may physically connect at the different locations, compatibility issues may arise. Thus, the controller 202 may perform a scan for devices placed on interconnections such as the bus 204 and the point-to-point link 314 for devices associated with storage system 200 to identify potential compatibility issues. For example, compatibility issues may arise between a combination of the SCSI controller and an SCSI hardware device, the SCSI controller and an attached enclosure, the enclosure and an SCSI device, and the SCSI device and another SCSI device. Furthermore, firmware compatibility issues may arise, including instances in which the devices lack the most up-to-date revision of the appropriate respective firmware.

A storage system may also include a service processor within the system. The service processor performs the function of monitoring the health of the platform components, peripheral components, and applications and operating systems that are running on the system. The service processor also performs a logging function and is able to remotely notify an administrator of the status and various operational issues related to the system. The service processor can also receive malfunction or alert notices issues by the hardware or software components of the system.

Figure 4:
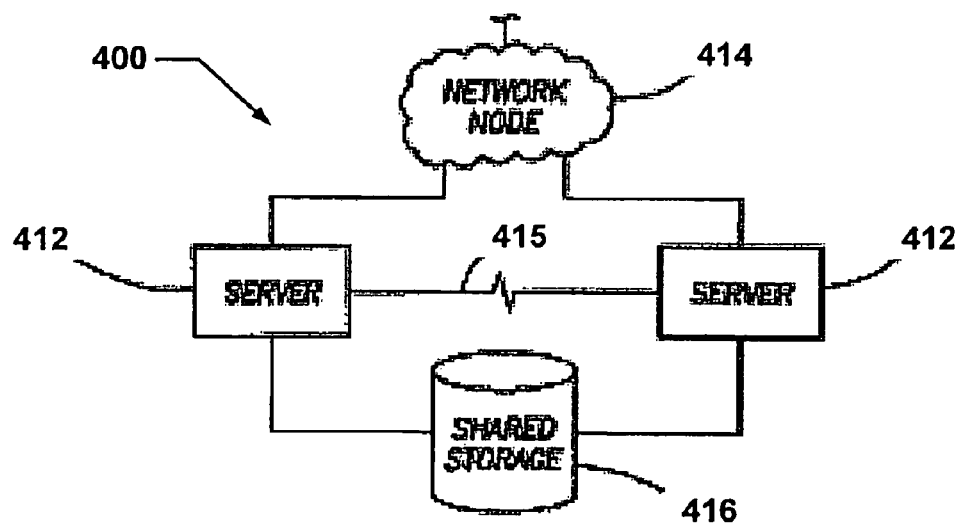
FIG. 4 is a block diagram of a server cluster network.

Shown in FIG. 4 is an exemplary embodiment of a two-node server cluster network 400. The server cluster network 400 may include server nodes 412 that may be interconnected to one another by a heartbeat or communications link 415. Each of the server nodes 412 may be coupled to a network node 414, which represents a connection to a communications network served by the server nodes 412. Each of the server nodes 412 may be coupled to a shared storage unit 416.

Figure 5:
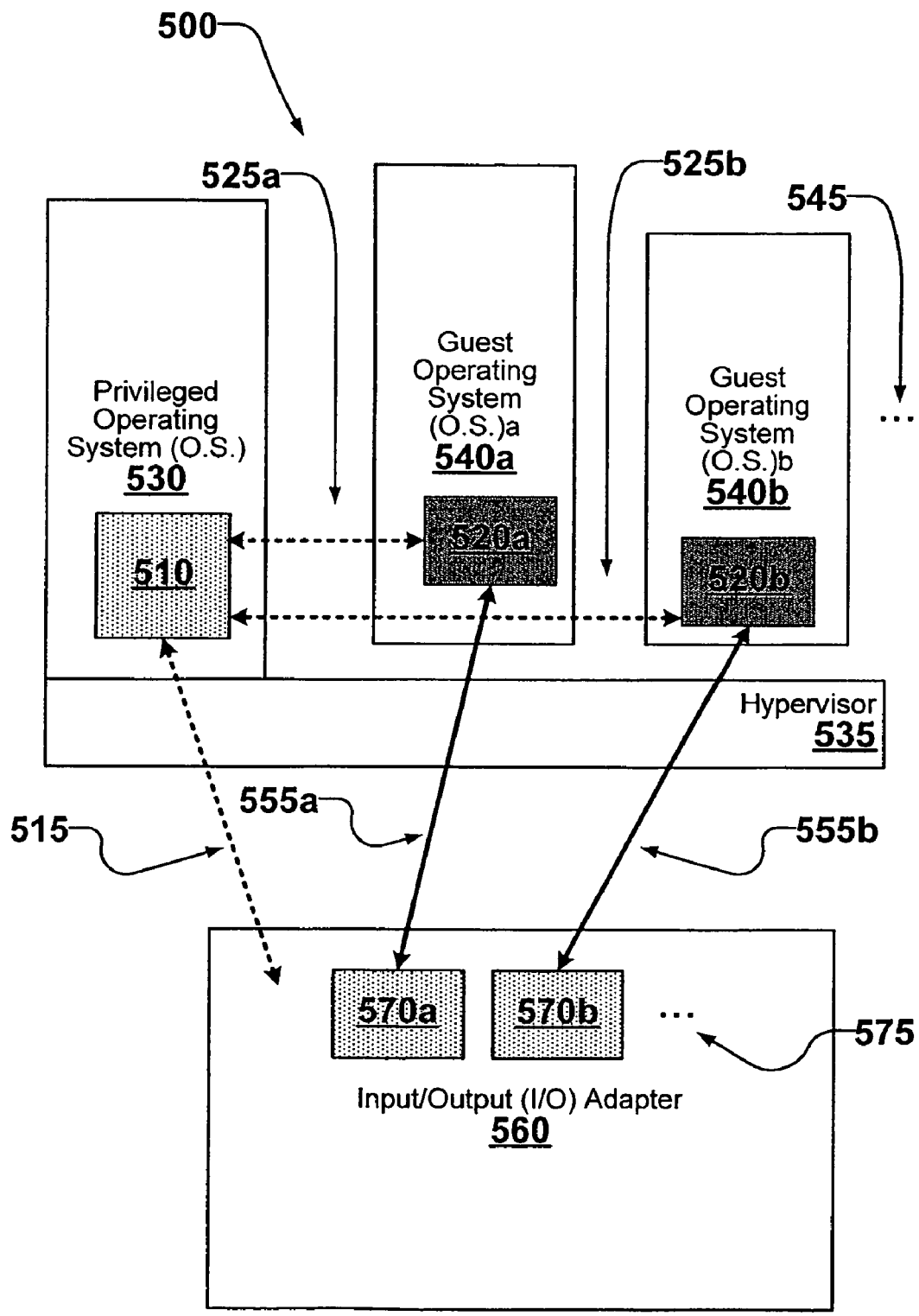
FIG. 5 is a diagram of a system useful in various exemplary embodiments, according to teachings of the present disclosure.

FIG. 5 is a diagram of a system 500 enabling virtualized input/output. The system 500 may include a back-end driver component 510 running back-end in a privileged operating system address space 530 disposed on a hypervisor 535. The system 500 may also include active front-end driver components 520a, 520b running in the front-end in respective guest operating system address spaces 540a, 540b, . . . (as indicated at 545). The system 500 may also include input/output contexts 570a, 570b, . . . (as indicated at 575), in an input/output adapter 560. Guest operating systems 540a, 540b interface with hypervisor 535.

The system 500 may also include communication paths 525a, 525b having been established between the active front-end driver components 520a, 520b and the back-end driver component 510. The system 500 may also include input/output context associations established between the input/output contexts 570a, 570b in the input/output adapter 560 and the active front-end driver components 520a, 520b, through respective data input/output paths, as indicated at 555a, 555b.

The input/output adapter 560 may be capable of being configured using the back-end driver component 510 running back-end in the privileged operating system address space 530 through a setup/control path 515. The back-end driver component 510 may be capable of registering with the input/output adapter 560 to receive information concerning catastrophic events, through the setup/control path 515, for example.

The communication paths 525a, 525b may be capable of transmitting the information concerning the catastrophic events to the active front-end driver components 520a, 520b running in the front-end in the respective guest operating system address spaces 540a, 540b. A front-end driver component may be considered active, such as the active front-end driver components 520a, 520b, when loaded into a guest operating system address space, such as the respective guest operating system address spaces 540a, 540b, and when a communication path, such as the communication paths 525a, 525b, has been established with the back-end driver component 510, for example. The back-end driver component 510 may be capable of receiving requests from the active front-end driver components 520a, 520b.

The input/output contexts 570a, 570b in the input/output adapter 560 may be capable of having an input/output context association established between the input/output contexts 570a, 570b in the input/output adapter 560 and the active front-end driver components 520a, 520b, whenever the back-end driver component 510 receives the requests from the active front-end driver components 520a, 520b. The input/output context associations may enable the respective guest operating system address spaces 540a, 540b to perform isolated input/output operations directly with the input/output adapter 560 through a respective data input/output path, as indicated at 555a, 555b, for example.

The input/output context associations in the system 500 may be capable of being made dynamically at a session level of granularity for more efficient input/output load balancing. An application running in the respective guest operating system address spaces 540a, 540b may be capable of continuing to perform isolated input/output operations directly with the input/output adapter 560 through the respective data input/output path(s) 555a, 555b during an established session even if the back-end driver component 510 fails, once the input/output context association has been established. The active front-end driver components 520a, 520b may be capable of (1) assuming full control of the respective data input/output path(s) 555a, 555b, the aspect of full control comprising either flow control and queuing, for example, (2) negotiating with the back-end driver component 510 for a higher bandwidth and/or sustained connectivity to the input/output adapter 560 spanning a plurality of sessions, and/or (3) registering with the input/output adapter 560 to receive data input/output path specific events directly, once the input/output context association has been established, as indicated at 555a, 555b, for example.

Figure 6:
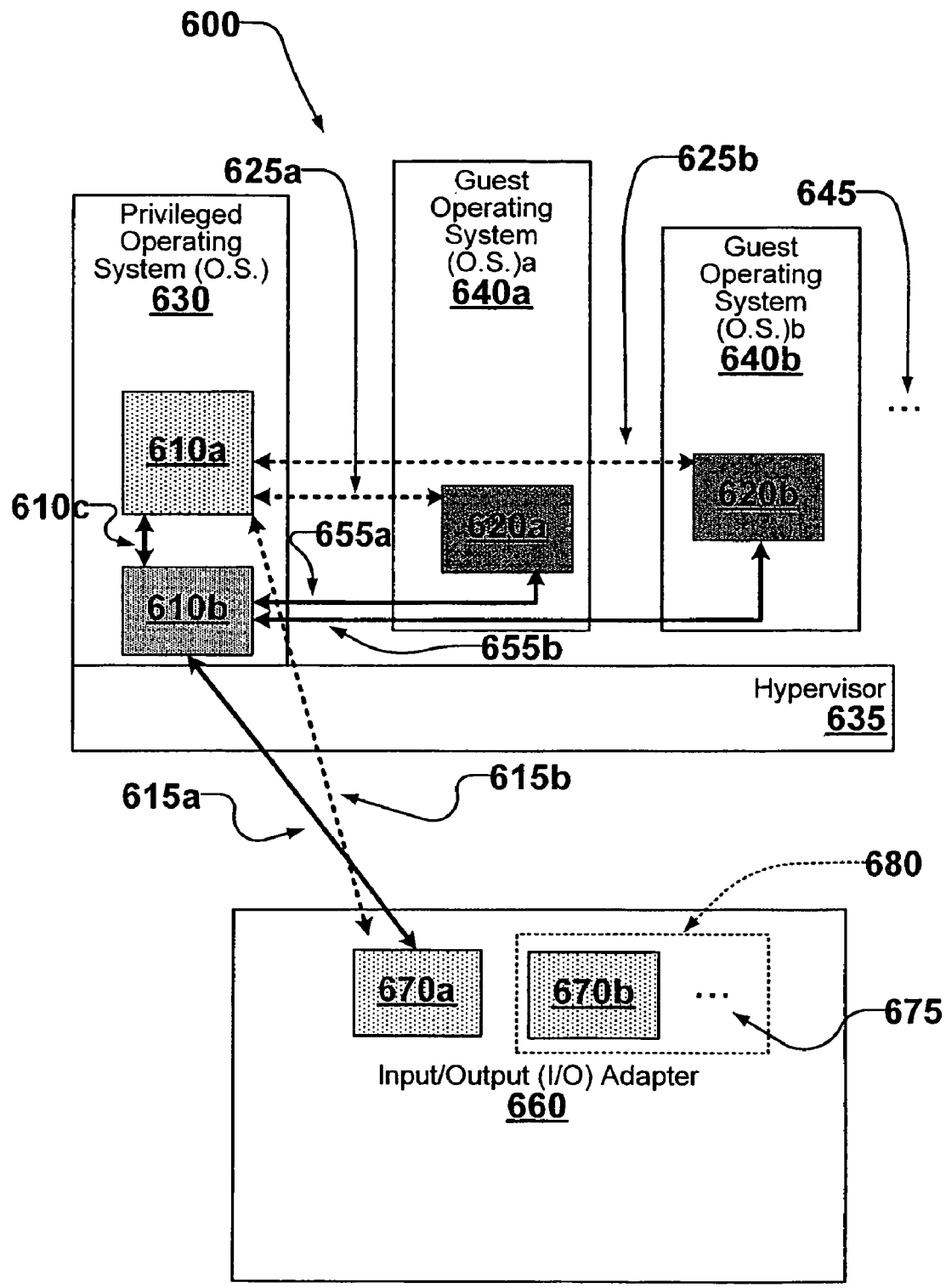
FIG. 6 is a diagram of another system useful in various exemplary embodiments, according to teachings of the present disclosure.

FIG. 6 is a diagram of a system 600 enabling virtualized input/output. The system 600 may include a back-end setup/control driver component 610a communicating with an input/output virtualization driver 610b, as indicated at 610c, the back-end setup/control driver component 610a and the input/output virtualization driver 610b both running back-end in the privileged operating system address space 630 disposed on the hypervisor 635. The system 600 may also include the active front-end driver components 620a, 620b running in the front-end in the respective guest operating system address spaces 640a, 640b, . . . (as indicated at 645). The system 600 may also include only one available input/output context 670a in the input/output adapter 660, any other input/output contexts 670b, . . . (as indicated at 675) being unavailable (if present at all), as indicated in phantom at 680.

The system 600 may also include communication paths 625a, 625b having been established between the active front-end driver components 620a, 620b and the back-end setup/control driver component 610a. The system 600 may also include a shared input/output context association established between the one available input/output context 670a in the input/output adapter 660 and the input/output virtualization driver 610b through a scalable data input/output path 615a. The system 600 may also include an association between the input/output virtualization driver 610b and the active front-end driver components 620a, 620b, through respective data input/output paths, as indicated at 655a, 655b, in a scalable mode of operation.

The input/output adapter 660 may be capable of being configured using the back-end setup/control driver component 610a running back-end in the privileged operating system address space 630 through a setup/control path 615b. The back-end setup/control driver component 610a may be capable of registering with the input/output adapter 660 to receive information concerning catastrophic events, through the setup/control path 615b, for example.

The communication paths 625a, 625b may be capable of transmitting the information concerning the catastrophic events to the active front-end driver components 620a, 620b running in the front-end in the respective guest operating system address spaces 640a, 640b. A front-end driver component may be considered active, such as the active front-end driver components 620a, 620b, when loaded into a guest operating system address space, such as the respective guest operating system address spaces 640a, 640b, and when a communication path, such as the communication paths 625a, 625b, has been established with the back-end setup/control driver component 610a, for example. The back-end setup/control driver component 610a may be capable of receiving requests from the active front-end driver components 620a, 620b.

Figure 7:
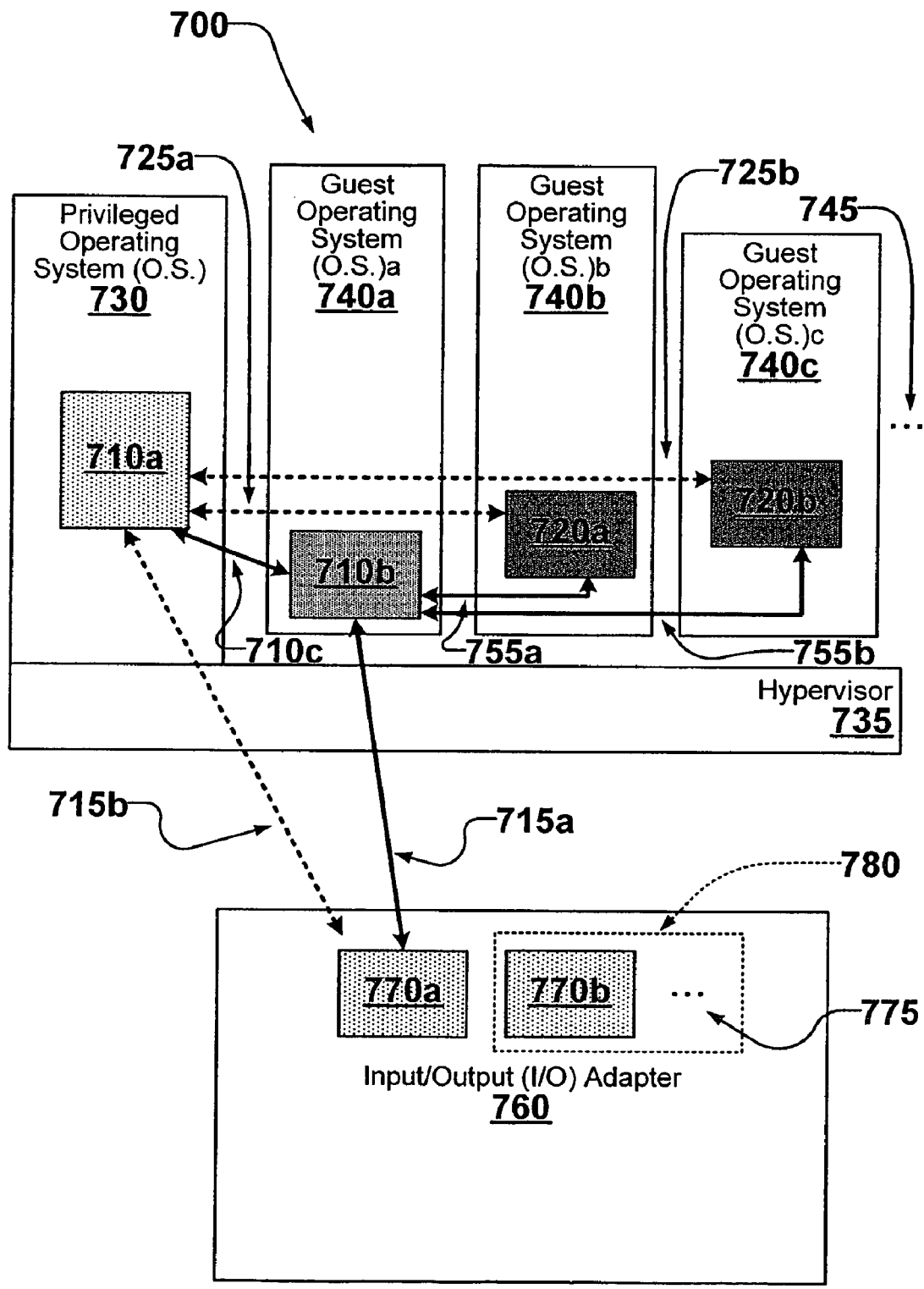
FIG. 7 is a diagram of yet another system useful in various exemplary embodiments, according to teachings of the present disclosure.

FIG. 7 is a diagram of a system 700 enabling virtualized input/output. The system 700 may also include the back-end setup/control driver component 710a communicating with the input/output virtualization driver 710b, as indicated at 710c, the back-end setup/control driver component 710a running back-end in the privileged operating system address space 730 disposed on the hypervisor 735, the input/output virtualization driver 710b running in a guest operating system address space 740a, one of guest operating system address spaces 740a, 740b, . . . (as indicated at 745). The system 700 may also include active front-end driver components 720a, 720b running in the front-end in the respective guest operating system address spaces 740b, 740c, . . . (as indicated at 745). The system 700 may also include only one available input/output context 770a in the input/output adapter 760, any other input/output contexts 770b, . . . (as indicated at 775) being unavailable (if present at all), as indicated in phantom at 780.

The system 700 may also include communication paths 725a, 725b having been established between the active front-end driver components 720a, 720b and the back-end setup/control driver component 710a. The system 700 may also include a shared input/output context association established between the one available input/output context 770a in the input/output adapter 760 and the input/output virtualization driver 710b through the scalable data input/output path 715a. The system 700 may also include an association between the input/output virtualization driver 710b and the active front-end driver components 720a, 720b, through respective data input/output paths, as indicated at 755a, 755b, in the scalable mode of operation.

The input/output adapter 760 may be capable of being configured using the back-end setup/control driver component 710a running back-end in the privileged operating system address space 730 through the setup/control path 715b. The back-end setup/control driver component 710a may be capable of registering with the input/output adapter 760 to receive information concerning catastrophic events, through the setup/control path 715b, for example.

The communication paths 725a, 725b may be capable of transmitting the information concerning the catastrophic events to the active front-end driver components 720a, 720b running in the front-end in the respective guest operating system address spaces 740b, 740c. A front-end driver component may be considered active, such as the active front-end driver components 720a, 720b, when loaded into a guest operating system address space, such as the respective guest operating system address spaces 740b, 740c, and when a communication path, such as the communication paths 725a, 725b, has been established with the back-end setup/control driver component 710a, for example. The back-end setup/control driver component 710a may be capable of receiving requests from the active front-end driver components 720a, 720b.

Figure 8:
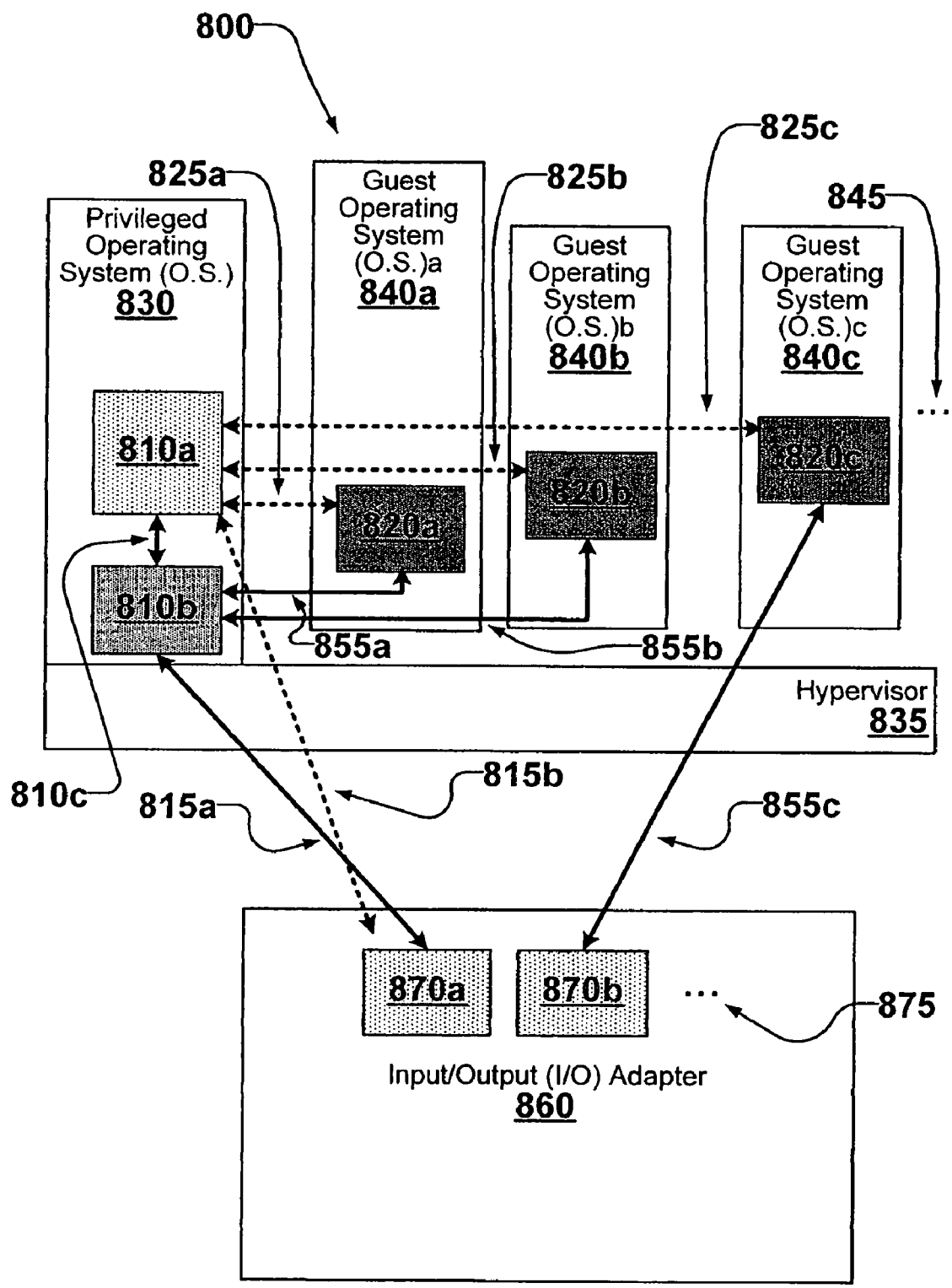
FIG. 8 is a diagram of still yet another system useful in various exemplary embodiments, according to teachings of the present disclosure.

FIG. 8 is a diagram of a system 800 enabling virtualized input/output. The system 800 may include the back-end setup/control driver component 810a communicating with the input/output virtualization driver 810b, as indicated at 810c, the back-end setup/control driver component 810a and the input/output virtualization driver 810b both running back-end in the privileged operating system address space 830 disposed on the hypervisor 835, as in the system 800, as shown in FIG. 8, for example. The system 800 may also include active front-end driver components 820a, 820b, 820c running in the front-end in respective guest operating system address spaces 840a, 840b, 840c . . . (as indicated at 845). The system 800 may also include the input/output contexts 870a, 870b, . . . (as indicated at 875), in the input/output adapter 860.

The system 800 may also include communication paths 825a, 825b, 825c having been established between the active front-end driver components 820a, 820b, 820c and the back-end setup/control driver component 810a. The system 800 may also include a shared input/output context association established between one available input/output context 870a in the input/output adapter 860 and the input/output virtualization driver 810b through a scalable data input/output path 815a. The system 800 may also include an association between the input/output virtualization driver 810b and at least two of the active front-end driver components 820a, 820b, through respective data input/output paths, as indicated at 855a, 855b, in a scalable mode of operation.

The input/output adapter 860 may be capable of being configured using the back-end setup/control driver component 810a running back-end in the privileged operating system address space 830 through a setup/control path 815b. The back-end setup/control driver component 810a may be capable of registering with the input/output adapter 860 to receive information concerning catastrophic events, through the setup/control path 815b, for example.

A dedicated input/output context 870b in the input/output adapter 860 may be capable of having a dedicated input/output context association established between the dedicated input/output context 870b in the input/output adapter 860 and a respective, active front-end driver components 820c whenever the back-end setup/control driver component 810a receives requests from the active front-end driver component 820c. The dedicated input/output context association may enable the respective guest operating system address space 840c to perform isolated input/output operations directly with the input/output adapter 860 through a respective performance data input/output path, as indicated at 855c, for example.

The communication paths 825a, 825b, 825c may be capable of transmitting the information concerning the catastrophic events to the active front-end driver components 820a, 820b, 820c running in the front-end in the respective guest operating system address spaces 840a, 840b, 840c. A front-end driver component may be considered active, such as the active front-end driver components 820a, 820b, 820c, when loaded into a guest operating system address space, such as the respective guest operating system address spaces 840a, 840b, 840c, and when a communication path, such as the communication paths 825a, 825b, 825c, has been established with the back-end setup/control driver component 810a, for example. The back-end setup/control driver component 810a may be capable of receiving requests from the active front-end driver components 820a, 820b, 820c.

The shared and/or dedicated input/output context associations in the system 800 may be capable of being made dynamically at a session level of granularity for more efficient input/output load balancing. An application running in the respective guest operating system address space 840*c* may be capable of continuing to perform isolated input/output operations directly with the input/output adapter 860 through the respective performance data input/output path 855*c* during an established session even if the back-end setup/control driver component 810*a* fails, once the dedicated input/output context association has been established. The active front-end driver component 820*c* may be capable of (1) assuming full control of the respective performance data input/output path 855*c*, the full control comprising either flow control and queuing, for example, (2) negotiating with the back-end setup/control driver component 810*a* for a higher bandwidth and/or sustained connectivity to the input/output adapter 860 spanning a plurality of sessions, and/or (3) registering with the input/output adapter 860 to receive data input/output path specific events directly, once the dedicated input/output context association has been established, as indicated at 855*c*, for example.

The systems disclosed herein may be capable of determining how many input/output contexts are available in the input/output adapter to determine the number of available input/output contexts in the input/output adapter. For example, as shown in FIGS. 6 and 7, only one input/output context 670*a* may be available.

The systems disclosed herein may be capable of operating in a performance mode of operation and/or a scalable mode of operation. For example, the systems may be capable of operating in the performance mode of operation upon receiving a request from one of the plurality of active front-end driver components when (1) the number of available input/output contexts in the input/output adapter is at least equal to the number of the plurality of guest operating system address spaces, and/or (2) a guest operating system is performance-sensitive and requires a dedicated input/output context, such as the dedicated input/output contexts shown in FIGS. 6 and 8.

Similarly, the systems disclosed herein may be capable of operating in the scalable mode of operation upon receiving a request from one of the plurality of active front-end driver components when the number of available input/output contexts is less than the number of the plurality of guest operating system address spaces. Likewise, the systems disclosed herein may be capable of operating in the scalable mode of operation upon receiving a request from one of the plurality of active front-end driver components when the number of available input/output contexts is less than the number of the plurality of guest operating system address spaces. The systems disclosed herein, such as the system disclosed in FIG. 8, may be capable of operating in the scalable mode of operation and in the performance mode of operation at the same time.

Figure 9:
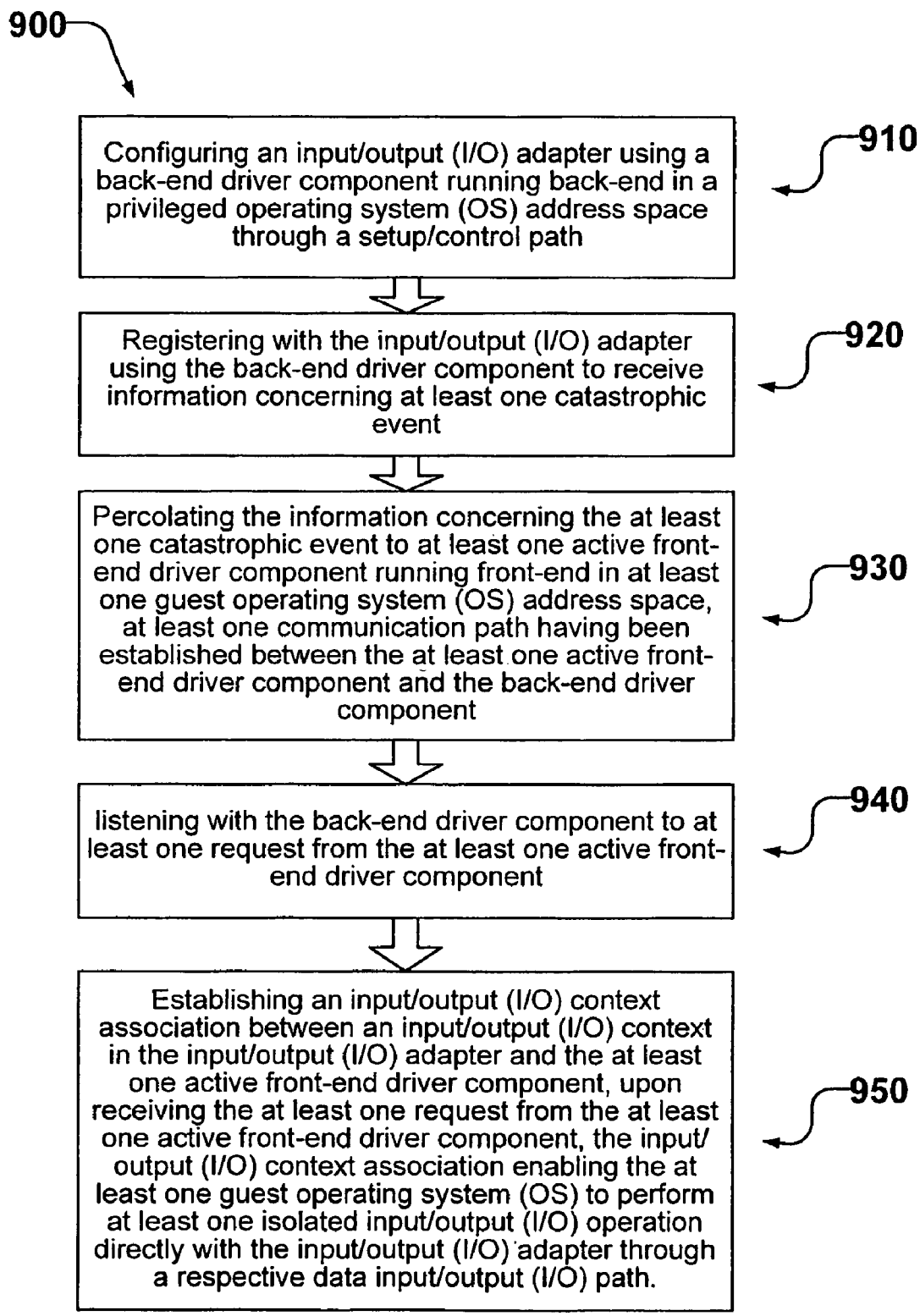
FIG. 9 is an exemplary method to virtualize input/output, according to teachings of the present disclosure.

As shown in FIG. 9, a method 900 to virtualize input/output may be provided. The method 900 may comprise configuring an input/output adapter using a back-end driver component running back-end in a privileged operating system address space through a setup/control path, as indicated at 910. For example, the input/output adapter may be configured using the back-end driver component running back-end in the privileged operating system address space through a setup/control path. Similarly, in other systems, the input/output adapter may be configured using the back-end setup/control driver component running back-end in the privileged operating system address space through a setup/control path. Likewise, in other systems, the input/output adapter may be configured using the back-end setup/control driver component running back-end in the privileged operating system address space through the setup/control path.

The method 900 may also comprise registering with the input/output adapter using the back-end driver component to receive information concerning a catastrophic event, as indicated at 920. For example, in the system 600, the back-end driver component may register with the input/output adapter to receive information concerning a catastrophic event, through the setup/control path. In other systems, the back-end setup/control driver component may register with the input/output adapter to receive information concerning a catastrophic event, through the setup/control path. In other systems, the back-end setup/control driver component may register with the input/output adapter to receive information concerning a catastrophic event, through the setup/control path.

The method 900 may also comprise transmitting the information concerning the catastrophic event to an active front-end driver component running in the front-end in a guest operating system address space, a communication path having been established between the active front-end driver component and the back-end driver component, as indicated at 930. For example, the back-end driver component may transmit the information concerning a catastrophic event to an active front-end driver component that is running in the front-end in a guest operating system address space. In this example, a communication path was previously established between the active front-end driver component and the back-end driver component. Similarly, in other systems, the back-end setup/control driver component may transmit the information concerning a catastrophic event to an active front-end driver component that is running in the front-end in a guest operating system address space. In this example, a communication path was previously established between the active front-end driver component and the back-end setup/control driver component.

The method 900 may also comprise listening with the back-end driver component to a request from the active front-end driver component, as indicated at 940. For example, the back-end driver component may listen to a request from an active front-end driver component. The method 900 may also comprise establishing an input/output context association between an input/output context in the input/output adapter and the active front-end driver component, upon receiving the request from the active front-end driver component. In this example, the input/output context association enables the guest operating system to perform an isolated input/output operation directly with the input/output adapter through a respective data input/output path, as indicated at 950. As an example, an input/output context association may be established between the input/output context in the input/output adapter and an active front-end driver component. Upon receiving a request from an active front-end driver component, the input/output context association enables a guest operating system to perform an isolated input/output operation directly with the input/output adapter through the respective data input/output path.

The method 900 may further comprise assuming full control of the respective data input/output path using the active front-end driver component. The full control may comprise flow control and/or queuing, for example. As an example, an active front-end driver component may assume full control of the respective data input/output path, where the full control may comprise flow control and/or queuing. Establishing the input/output context association between the input/output context in the input/output adapter and the active front-end driver component in the method 900 may further comprise making the input/output context association dynamically at a session level of granularity for more efficient input/output load balancing. As an example, establishing the input/output context association between the input/output context in the input/output adapter and an active front-end driver component may further comprise making the input/output context association dynamically at a session level of granularity for more efficient input/output load balancing.

Establishing the input/output context association between the input/output context in the input/output adapter and the active front-end driver component in the method 900 may further comprise continuing to perform the isolated input/output operation directly with the input/output adapter through the respective data input/output path using an application running in the guest operating system during an established session even if the back-end driver component fails, once the input/output context association has been established. As an example, establishing the input/output context association between the input/output context in the input/output adapter and an active front-end driver component may further comprise continuing to perform an isolated input/output operation directly with the input/output adapter through the respective data input/output path using an application running in a guest operating system.

The method 900 may further comprise negotiating with the back-end driver component for either a higher bandwidth or sustained connectivity to the input/output adapter spanning a plurality of sessions using the active front-end driver component. For example, an active front-end driver component may negotiate with the back-end driver component for a higher bandwidth and/or sustained connectivity to the input/output adapter spanning a plurality of sessions. The method 900 may further comprise registering with the input/output adapter to receive data input/output path specific events directly using the active front-end driver component, once the input/output context association has been established. For example, an active front-end driver component may register with the input/output adapter to receive respective data input/output path events directly, once the input/output context association has been established.

A method to virtualize input/output may comprise configuring the input/output adapter using the back-end setup/control driver component. This component runs in the back-end in the privileged operating system address space through the setup/control path, and the back-end setup/control driver component communicates with the input/output virtualization driver. A method to virtualize input/output may also comprise registering with the input/output adapter using the back-end setup/control driver component to receive information concerning a catastrophic event, through the setup/control path, for example. A method to virtualize input/output may also comprise transmitting the information concerning the catastrophic event to the plurality of active front-end driver components running in the front-end in the plurality of guest operating system address spaces. A communication path is established between each of the plurality of active front-end driver components and the back-end setup/control driver component. A method to virtualize input/output may also comprise receiving with the back-end setup/control driver component a request from one of the plurality of active front-end driver components. A method to virtualize input/output may also comprise determining how many input/output contexts are available in the input/output adapter to determine the number of available input/output contexts in the input/output adapter.

A method to virtualize input/output may also comprise operating in a performance mode of operation and/or a scalable mode of operation. A method to virtualize input/output may also comprise operating in the performance mode of operation upon receiving a request from one of the plurality of active front-end driver components when (1) the number of available input/output contexts in the input/output adapter is at least equal to a number of the plurality of guest operating system address spaces, and/or (2) a guest operating system is performance-sensitive, requiring the dedicated input/output context. A method to virtualize input/output may also comprise operating in the scalable mode of operation upon receiving a request from one of the plurality of active front-end driver components when the number of available input/output contexts in the input/output adapter is less than the number of the plurality of guest operating system address spaces.

A method to virtualize input/output may also comprise establishing a dedicated input/output context association between the dedicated input/output contexts in the input/output adapter and one of the plurality of active front-end driver components in the performance mode of operation. The dedicated input/output context association enables a guest operating system to perform an isolated input/output operation directly with the input/output adapter through the respective performance data input/output path. A method to virtualize input/output may also comprise invoking the input/output virtualization driver running in either the privileged operating system address space or one of the plurality of guest operating system address spaces, such as the guest operating system address space. A shared input/output context association is established between the shared input/output context in the input/output adapter and the input/output virtualization driver through the scalable data input/output path, and an association is established between the input/output virtualization driver and one of the plurality of active front-end driver components through the respective data input/output paths in the scalable mode of operation.

The method and system disclosed and described herein may be advantageous in providing the following: (1) elimination of a single point of failure for input/output functions and establishment of new input/output connections, since not all communications, including not all control and data path communications, between applications running in the guest operating systems and the input/output adapter, traverse the back-end driver component, (2) a non-degraded input/output performance by decreasing any buffer remap and/or any buffer copy, (3) elimination of input/output bottlenecks may result due to elimination of a single scheduler for input/output, (4) decreased requirement for specialized drivers for the guest operating systems as well as the "Domain 0" privileged operating system environments, and/or (5) a decreased latency caused in registering an input/output event. A method and system to virtualize input/output may provide these advantages by further factoring conventional split driver models, for example.

The back-end setup/control driver in the privileged operating system may be responsible for initial discovery and configuration of the input/output adapter. The back-end setup/control driver may register with the input/output adapter to receive information concerning catastrophic events. The information concerning catastrophic events may then be transmitted up and out to all the active front-end drivers via notifications. A front-end driver may be considered active when the front-end driver is loaded into a guest operating system address space and has established a communication path with the back-end setup/control driver.

The back-end setup/control driver may listen substantially constantly to requests from the active front-end drivers in the respective guest operating system address spaces. Upon receiving a request from any one of the active front-end drivers, in the performance mode of operation, the back-end setup/control driver may establish a dedicated input/output context association between an available dedicated input/output context in the input/output silicon of the input/output adapter and the requesting one of the active front-end drivers in one of the respective guest operating system address spaces. This available dedicated input/output context may then enable the respective guest operating system address space to perform directly isolated input/output operations with the input/output adapter through the respective data input/output path. The dedicated input/output context association(s) may be dynamically made at a session level of granularity for more efficient input/output load balancing.

Any one of these active front-end drivers in one of the respective guest operating system address spaces may assume full control of the respective data input/output path, including flow control and/or queuing, in the performance mode of operation. Once the available dedicated input/output context is set, any application running in the respective guest operating system may continue to perform directly isolated input/output operations with the input/output adapter through the respective data input/output path in and/or during the established session, even if the back-end setup/control driver fails, in the performance mode of operation.

Any one of these active front-end drivers in one of the respective guest operating system address spaces may negotiate with the back-end setup/control driver for higher bandwidth and/or sustained connectivity to the input/output adapter spanning multiple sessions, in the performance mode of operation. Once the dedicated input/output context association between the available dedicated input/output context in the input/output adapter and one of the active front-end drivers in one of the respective guest operating system address spaces, any one of the active front-end drivers may register with the input/output adapter to receive the respective performance data input/output path specific events directly, through the respective performance data input/output path, for example, in the performance mode of operation.

In the systems disclosed herein, whenever the number of the guest operating system address spaces supported is greater than the number of available input/output contexts in the input/output adapter, there may be a need to virtualize a shared input/output context to be shared by multiple guest operating systems, and, at the same time, reserve a few available dedicated input/output contexts for the guest operating systems that may require high performance and/or be performance-sensitive. For example, the architecture as described above may work under two modes of operation, a performance mode of operation and a scalability mode of operation, based on the number of guest operating systems as compared with the number of available input/output contexts available in the input/output adapter.

The performance mode of operation, for example, may deal with the case when a particular guest operating system may obtain a particular dedicated input/output context. The performance mode of operation may be the preferred mode of operation and/or the default mode of operation when there may be adequate numbers of available dedicated input/output contexts, and/or when a particular guest operating system may be highly performance-sensitive, requiring a particular dedicated input/output context, respectively. The scalability mode of operation, for example, may deal with the case when guest operating system may need to share a shared input/output context that is available in the input/output adapter. This situation may arise when there are more guest operating systems than the number of available input/output contexts available in the input/output adapter.

In the scalability mode of operation, the "Domain 0" privileged operating system may be involved in a two-step setup process. The first step may involve invoking the input/output virtualization driver, using the back-end setup/control driver component communicating with the input/output virtualization driver, for example, along with establishing the shared input/output context association between the available shared input/output context in the input/output adapter and the input/output virtualization driver, through the scalable data input/output path, for example. Following this, the second step of the two-step setup process may involve establishing an association between the input/output virtualization driver and the requesting guest operating systems by establishing an association between the input/output virtualization driver and the active front-end driver components through the respective data input/output paths. Note that the input/output virtualization driver may run on the "Domain 0" privileged operating system, as shown in FIGS. 6 and 8, or on another guest operating system.

The method and system disclosed and described herein provides increased input/output throughput as compared with the more limited conventional input/output throughput. Similarly, the method and system disclosed and described herein provides decreased input/output latency as compared with the more limited conventional input/output latency. Likewise, the method and system disclosed and described provides for the elimination of a single point of failure for input/output functions and establishment of new input/output connections, as described above.

Although various illustrative embodiments of the present invention and their advantages are described in detail, a person skilled in the art having the benefit of the present disclosure could make various alterations, additions, and/or omissions without departing from the spirit and scope of the present invention, as defined by the appended claims.

What is claimed is:

1. A method to virtualize input/output, the method comprising:
    configuring an input/output adapter using a back-end driver component running back-end in a privileged operating system address space through a setup/control path;
    registering with the input/output adapter using the back-end driver component to receive information concerning a catastrophic event, wherein the catastrophic events comprise data input/output path events;
    transmitting the information concerning the catastrophic event to an active front-end driver component running in the front-end in a guest operating system address space, a communication path having been established between the active front-end driver component and the back-end driver component;
    listening with the back-end driver component to a request from the active front-end driver component; and
    establishing an input/output context association between an input/output context in the input/output adapter and the active front-end driver component, upon receiving the request from the active front-end driver component, the input/output context association enabling the guest operating system to perform an isolated input/output operation directly with the input/output adapter through a respective data input/output path, wherein the input/output context association terminates at the conclusion of a discrete-time session.

2. The method of claim 1 further comprising:
    assuming full control of the respective data input/output path using the active front-end driver component.

3. The method of claim 1 further comprising:
assuming full control of the respective data input/output path using the active front-end driver component, the full control comprising either flow control and queuing.

4. The method of claim 1, wherein establishing the input/output context association between the input/output context in the input/output adapter and the active front-end driver component further comprises making the input/output context association dynamically at a session level of granularity for more efficient input/output load balancing.

5. The method of claim 1, wherein establishing the input/output context association between the input/output context in the input/output adapter and the active front-end driver component further comprises continuing to perform the isolated input/output operation directly with the input/output adapter through the respective data input/output path using an application running in the guest operating system during an established session even if the back-end driver component fails, once the input/output context association has been established.

6. The method of claim 1 further comprising:
negotiating with the back-end driver component for either a higher bandwidth or sustained connectivity to the input/output adapter spanning a plurality of sessions using the active front-end driver component.

7. The method of claim 1 further comprising:
registering with the input/output adapter to receive data input/output path specific events directly using the active front-end driver component, once the input/output context association has been established.

8. The method of claim 1 further comprising:
assuming full control of the respective data input/output path using the active front-end driver component, the full control comprising either flow control or queuing, an application running in the guest operating system being capable of continuing to perform the isolated input/output operation directly with the input/output adapter through the respective data input/output path during an established session even if the back-end driver component fails, once the input/output context association has been established; and
negotiating with the back-end driver component for either a higher bandwidth or sustained connectivity to the input/output adapter spanning a plurality of sessions using the active front-end driver component.

9. The method of claim 1 further comprising:
assuming full control of the respective data input/output path using the active front-end driver component, the full control comprising either flow control or queuing, an application running in the guest operating system being capable of continuing to perform the isolated input/output operation directly with the input/output adapter through the respective data input/output path during an established session even if the back-end driver component fails, once the input/output context association has been established;
negotiating with the back-end driver component for either a higher bandwidth or sustained connectivity to the input/output adapter spanning a plurality of sessions using the active front-end driver component; and
registering with the input/output adapter to receive data input/output path specific events directly using the active front-end driver component, once the input/output context association has been established.

10. A method to virtualize input/output, the method comprising:
configuring an input/output adapter using a back-end setup/control driver component running back-end in a privileged operating system address space through a setup/control path, the back-end setup/control driver component communicating with an input/output virtualization driver;
registering with the input/output adapter using the back-end setup/control driver component to receive information concerning a catastrophic event, wherein the catastrophic events comprise data input/output path events;
transmitting the information concerning the catastrophic event to a plurality of active front-end driver components running in the front-end in a plurality of guest operating system address spaces, a communication path having been established between each of the plurality of active front-end driver components and the back-end setup/control driver component;
listening with the back-end setup/control driver component to a request from one of the plurality of active front-end driver components;
determining how many input/output contexts are available in the input/output adapter to determine a number of available input/output contexts in the input/output adapter;
operating in a performance mode of operation or a scalable mode of operation, operating in the performance mode of operation upon receiving the request from at least one of the plurality of active front-end driver components, when one of the number of available input/output contexts in the input/output adapter is at least equal to a number of the plurality of guest operating system address spaces and a guest operating system is performance-sensitive requiring the dedicated input/output context, and operating in the scalable mode of operation upon receiving the request from at least one of the plurality of active front-end driver components, when the number of available input/output contexts in the input/output adapter is less than the number of the plurality of guest operating system address spaces;
establishing a dedicated input/output context association between a dedicated input/output context in the input/output adapter and at least one of the plurality of active front-end driver components in the performance mode of operation, the dedicated input/output context association enabling the guest operating system to perform an isolated input/output operation directly with the input/output adapter through a respective performance data input/output path, wherein the input/output context association terminates at the conclusion of a discrete-time session; and
invoking the input/output virtualization driver running in one of the privileged operating system address space and one of the plurality of guest operating system address spaces, establishing a shared input/output context association between a shared input/output context in the input/output adapter and the input/output virtualization driver through a scalable data input/output path, and establishing an association between the input/output virtualization driver and at least one of the plurality of active front-end driver components through a respective data input/output path in the scalable mode of operation.

11. The method of claim 10 further comprising:
assuming full control of the respective performance data input/output path using the plurality of active front-end driver components.

12. The method of claim 10 further comprising:
assuming full control of the respective performance data input/output path using the plurality of active front-end driver components, the full control comprising flow control or queuing.

13. The method of claim 10, wherein establishing the dedicated input/output context association between the dedicated input/output context in the input/output adapter and the of the plurality of active front-end driver components in the performance mode of operation further comprises making the dedicated input/output context association dynamically at a session level of granularity for more efficient input/output load balancing.

14. The method of claim 10, wherein establishing the dedicated input/output context association between the dedicated input/output context in the input/output adapter and the of the plurality of active front-end driver components in the performance mode of operation further comprises continuing to perform the isolated input/output operation directly with the input/output adapter through the respective performance data input/output path using an application running in the guest operating system during an established session even if the back-end setup/control driver component fails, once the dedicated input/output context association has been established.

15. The method of claim 10 further comprising:
negotiating with the back-end setup/control driver component for either a higher bandwidth or sustained connectivity to the input/output adapter spanning a plurality of sessions using the plurality of active front-end driver components in the performance mode of operation.

16. The method of claim 10 further comprising:
registering with the input/output adapter to receive performance data input/output path specific events directly using the plurality of active front-end driver components, once the dedicated input/output context association has been established in the performance mode of operation.

17. The method of claim 10 further comprising:
assuming full control of the respective performance data input/output path using the of the plurality of active front-end driver components, the full control comprising flow control or queuing, an application running in the guest operating system being capable of continuing to perform the isolated input/output operation directly with the input/output adapter through the respective performance data input/output path during an established session even if the back-end setup/control driver component fails, once the dedicated input/output context association has been established in the performance mode of operation; and
negotiating with the back-end setup/control driver component for either a higher bandwidth or sustained connectivity to the input/output adapter spanning a plurality of sessions using the plurality of active front-end driver components in the performance mode of operation.

18. The method of claim 10 further comprising:
assuming full control of the respective performance data input/output path using the of the plurality of active front-end driver components, the full control comprising flow control or queuing, an application running in the guest operating system being capable of continuing to perform the isolated input/output operation directly with the input/output adapter through the respective performance data input/output path during an established session even if the back-end setup/control driver component fails, once the dedicated input/output context association has been established in the performance mode of operation;
negotiating with the back-end setup/control driver component for either a higher bandwidth or sustained connectivity to the input/output adapter spanning a plurality of sessions using the of the plurality of active front-end driver components in the performance mode of operation; and
registering with the input/output adapter to receive performance data input/output path specific events directly using the plurality of active front-end driver components, once the dedicated input/output context association has been established in the performance mode of operation.

19. A system enabling virtualized input/output, the system comprising:
an input/output adapter capable of being configured using a back-end driver component running back-end in a privileged operating system address space through a setup/control path, the back-end driver component capable of registering with the input/output adapter to receive information concerning a catastrophic event, wherein the catastrophic event comprises a data input/output path event;
an active front-end driver component running in the front-end in a guest operating system address space;
a communication path having been established between the active front-end driver component and the back-end driver component, the communication path capable of transmitting the information concerning the catastrophic event to the active front-end driver component running in the front-end in the guest operating system address space, the back-end driver component capable of listening to a request from the active front-end driver component; and
an input/output context in the input/output adapter capable of having an input/output context association established between the input/output context in the input/output adapter and the active front-end driver component, whenever the back-end driver component receives the request from the active front-end driver component, the input/output context association enabling the guest operating system to perform an isolated input/output operation directly with the input/output adapter through a respective data input/output path, wherein the input/output context association terminates at the conclusion of a discrete-time session.

20. The system of claim 19, wherein the input/output context association is capable of being made dynamically at a session level of granularity for more efficient input/output load balancing.

* * * * *